Nov. 20, 1962  J. B. HOLOUBEK ETAL  3,064,338
ARTICLE INSERTING APPARATUS
Filed Aug. 26, 1959  2 Sheets-Sheet 1

INVENTORS
J. B. HOLOUBEK
K. R. LAGLER
BY R. P. Miller
ATTORNEY

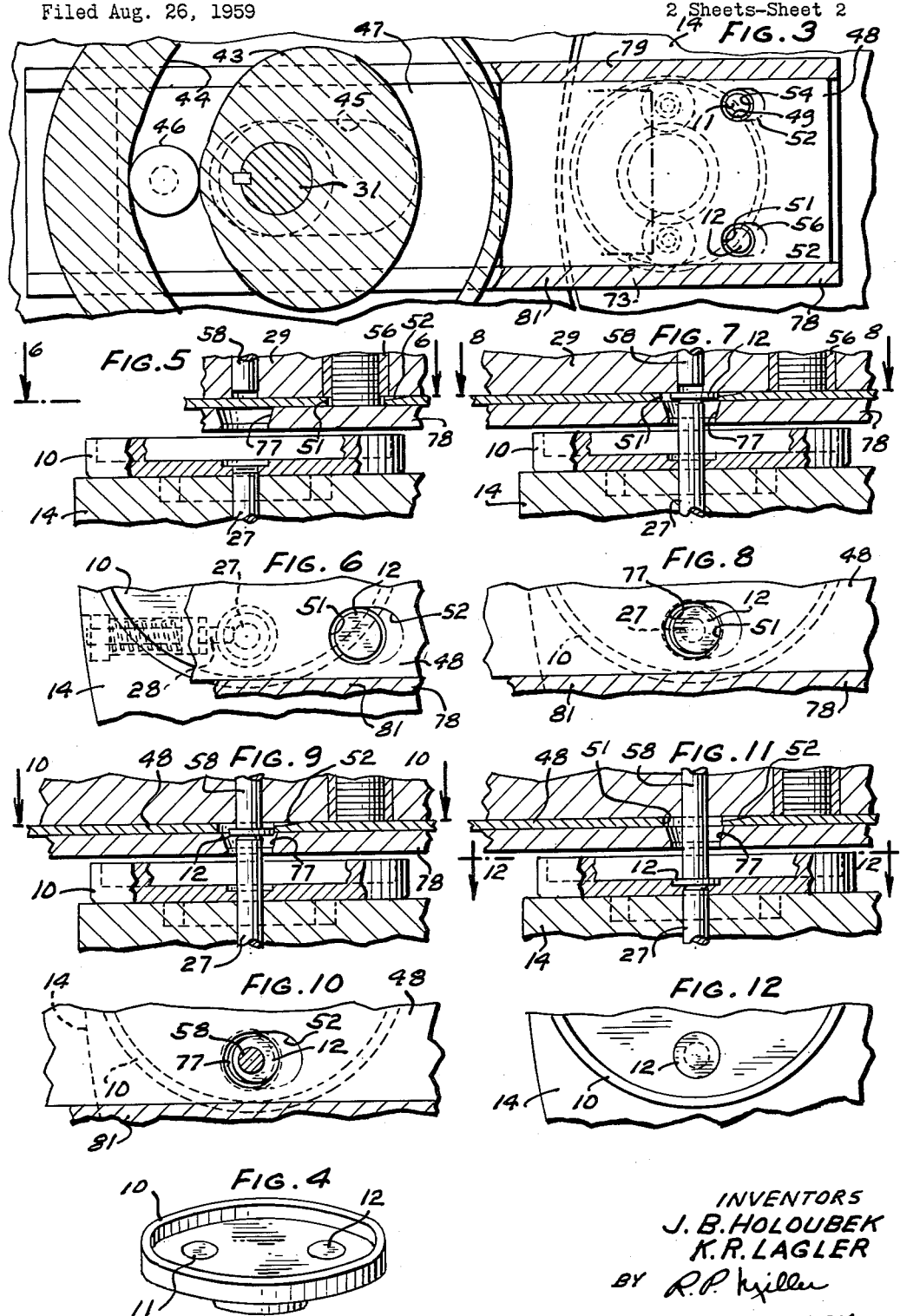

United States Patent Office 3,064,338
Patented Nov. 20, 1962

3,064,338
ARTICLE INSERTING APPARATUS
Joseph B. Holoubek and Karl R. Lagler, Indianapolis, Ind., assignors to Western Electric Company, Incorporated, New York, N.Y., a corporation of New York
Filed Aug. 26, 1959, Ser. No. 836,204
4 Claims. (Cl. 29—203)

This invention relates to article inserting apparatus, and more particularly to an apparatus for advancing a plurality of components from storage facilities into position to be picked up and guided into an article.

In automatic assembly installations, carriers such as conveyors or turntables are cyclically operated to advance articles through a plurality of individual mechanisms wherein components are advanced and assembled on or in the articles. It is of the utmost importance that each of these mechanisms positively function in order to avoid malfunction of subsequent fabricating facilities. It is a further criterion that the components be advanced and assembled without damage in diversely located sections of each article.

It is an object of the invention to provide a new and improved article inserting apparatus.

Another object of the invention resides in a positively driven mechanism for advancing components between the ends of guide pins and inserting pins that are subsequently moved to place the components within or upon an article.

A further object of the invention is the provision of a carrier for articles that operates in cooperation with a cam controlled mechanism for assembling components within the articles.

With these and other objects in view, the present invention contemplates a carrier for sequentially advancing articles to a component inserting mechanism. As each article is advanced into the inserting mechanism, a cam functions to move a set of guide pins through apertures formed in the article. A shuttle plate is actuated by the cam unit to advance a plurality of components onto the guide pins and into alignment with a set of inserting pins whereafter the cam unit functions to advance the inserting pins to move both the components and the guide pins into article.

Other objects and advantages of the present invention will be apparent from the following detailed description when considered in conjunction with the accompanying drawings, wherein FIG. 1 is a top plan view, partially cut away, illustrating a turntable for advancing articles into a component inserting mechanism;

FIG. 3 is a sectional view taken along line 3—3 of FIG. 2 particularly illustrating a shuttle mechanism for advancing components into position to be inserted within an article;

FIG. 4 is a perspective view of an article having components inserted therein by the mechanism shown in the other views:

FIG. 5 is a sectional view, partially cut away, of the shuttle mechanism in position to receive components;

FIG. 6 is a sectional view taken along line 6—6 of FIG. 5;

FIG. 7 is a sectional view, partially cut away, of a shuttle mechanism after advancing the components in position to be acted upon by an inserting member;

FIG. 8 is a sectional view taken along line 8—8 of FIG. 7;

FIG. 9 is a sectional view, partially cut away, of the shuttle mechanism showing the inserting member advanced into position to engage a component;

FIG. 10 is a sectional view taken along line 10—10 of FIG. 9;

FIG. 11 is a sectional view, partially cut away, of the shuttle mechanism and the inserting member advanced to position a component within an article, and FIG. 12 is a sectional view taken along line 12—12 of FIG. 11.

Figure 1:
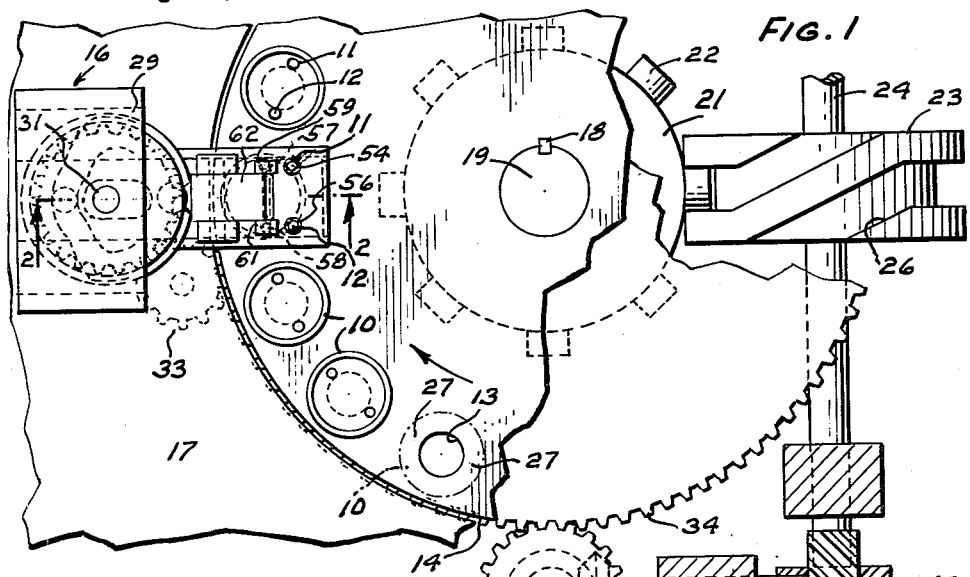

Referring first to FIG. 4, the part to be assembled by the apparatus shown in the other views is a disc-shaped bridge 10 of a telephone transmitter having a pair of diametrically opposed sintered steel discs 11 and 12 inserted within suitable apertures. The bridges 10 are loaded by an attendant into indentations 13 formed in a turntable 14 (see FIG. 1) which is indexed to advance each bridge through a series of fabricating machines (not shown) and into a disc inserting apparatus generally designated by the reference numeral 16. One of these fabricating machines may function as an orienting device to properly position the articles on the turntable to receive the discs 11 and 12. An orienting device of this type is disclosed in copending application Serial No. 836,209, filed August 26, 1959, by K. R. Lagler entitled "Article Orienting Apparatus," now Patent No. 2,968,387 granted Jan. 17, 1961. The inserting apparatus 16 is mounted on a table 17 that encompasses the turntable 14. When a bridge 10 is advanced into the inserting apparatus 16, the pair of sintered steel discs 11 and 12 is advanced into the apertures formed in the bridge.

As shown in FIG. 1, the turntable 14 is secured by a key 18 to a shaft 19 having a hub 21 from which radiate a plurality of evenly spaced drive pins 22. These drive pins are sequentially operated upon by a cam 23 to index the turntable 14. The cam 23 is secured to a continuously rotating drive shaft 24 and is provided with a trackway 26 that has two helical sections that cooperate with each succeeding pin 22 to rotate the shaft 19. When a pin 22 is positioned within a non-helical section of the trackway 26, the turntable is maintained in a stationary position so that a bridge 10 is positioned within the inserting apparatus 16.

Figure 2:
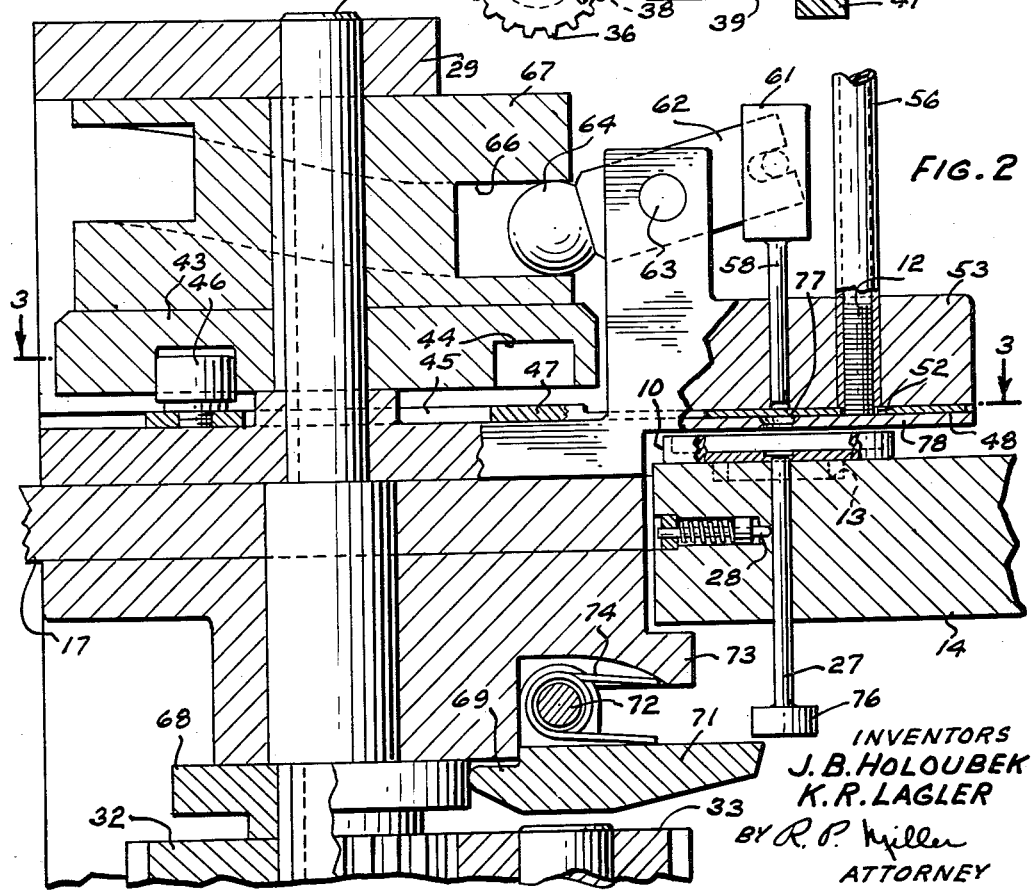
FIG. 2 is an enlarged sectional view taken along line 2—2 of FIG. 1 showing the details of construction of the component inserting mechanism embodying the principles of the present invention.

As shown in FIGS. 1 and 2, the turntable 14 is provided with a plurality of pairs of guide pins 27, each pair of which is positioned in alignment with a pair of apertures formed in a bridge 10. Each guide pin 27 is retained in position by a separate spring-biased holding pin 28. The spring-biased holding pins 28 will hold the associated pins 27 in any advanced position.

Considering now the details of construction of the inserting apparatus, attention is particularly directed to FIG. 2 wherein there is shown an upwardly extending frame or standard 29 mounted on the table 17 and which is bored to accommodate a cam shaft 31. Secured to the lower extremity of the cam shaft 31 is a gear 32 that meshes with a pinion 33 in engagement with a large drive gear 34 (see FIG. 1). Gear 34 is driven by a pinion 36 having a bevel gear 37 attached thereto. This bevel gear meshes with a bevel gear 38 connected to a shaft 39 having a spiral gear 41 attached thereto. Spiral gear 41 engages a spiral gear 42 that is mounted on the continuously rotating shaft 24. It may be thus understood that continuous rotation is imparted through the various gears to rotate the cam shaft 31.

Returning now to FIG. 2, the shaft 31 is shown as having a face cam 43 provided with a cam trackway 44 into which projects a cam follower 46 attached to a shuttle 47. As illustrated in FIGS. 2 and 3, the shuttle 47 is provided with an elongated slot 45 that encompasses the shaft 31 to permit reciprocation of the shuttle. The right-hand extremity of the shuttle 47 is formed as a blade 48 having a pair of apertures 49 and 51 into which are loaded the sintered steel discs 11 and 12. Each of the apertures 49 and 51 is associated with a bevel section 52 of the blade 48.

Mounted within a righthand section 53 of the frame 29 is a pair of stacks 54 and 56 for receiving the discs 11 and 12. Positioned for sliding movement within the frame section 53 is a pair of inserting pins 57 and 58 having enlarged head portions 59 and 61. A rod extends between head sections 59 and 61 and is positioned within bifurcations formed in a lever 62 pivotally mounted about a shaft 63. The lefthand extremity of the lever 62 is provided with a cam follower 64 that fits within a trackway 66 formed in a cam member 67 mounted on the shaft 31. Upon rotation of the cam member 67, the trackway is effective to pivot the lever 62 to move the inserting pins 57 and 58 toward the bridge 10.

There is also mounted on the cam shaft 31, a cam 68 adapted to act on a cam follower 69 of a lever 71 pivotally mounted on a shaft 72 secured within a frame section 73. A spring 74 engages the cam section 73 and acts on the lever 71 to urge the cam follower 69 into engagement with the cam 68. The righthand extremity of the lever 71 is adapted to act upon discs 76 secured to each pair of guide pins 27.

Considering the operation of the apparatus, rotation of the cam 23 rotates the turntable 14 to advance a bridge within the inserting apparatus 16. The cams 43, 67 and 68 are rotated but, at this time, are ineffective to actuate the associated mechanisms during rotation of the turntable. When the bridge 10 is positioned within the inserting apparatus 16, the cam 68 is rendered effective to pivot the lever 71 whereupon the pair of pins 27 are elevated to project through the aligned apertures formed in the bridge 10 and through a pair of funnel-shaped apertures 77 formed in a section 78 of the frame 29. The edges of section 78 of the frame are formed to provide guideways 79 and 81 for the shuttle 47 and the blade 48.

With the shuttle in the righthand position, the two lowermost discs 11 and 12 are positioned within the apertures 49 and 51. The cam 43 through the agency of the trackway 44 acts on the cam follower 46 to slide the shuttle 47 toward the left (see FIGS. 5-8). Movement of the shuttle 47 advances the blade 48, and the discs 11 and 12 are moved into alignment with the pins 27. The beveled surfaces 52 formed in the blade 48 insure that only one pair of discs 11 and 12 are removed from the stacks 54 and 56 during each movement of the shuttle 47. It will be noted from an inspection of FIG. 7 that the discs 11 and 12 rest upon the pins 27 which now project through the pair of funnel-shaped apertures 77 formed in section 78 of the frame 29.

Cam member 67 is now rendered effective to pivot the lever 62 whereupon the inserting pins 57 and 58 move into engagement with the positioned discs 11 and 12 (see FIGS. 9 and 10). At this time the high portion of the cam 68 is removed from the cam follower 69 thus permitting the spring 74 to withdraw the lever 71 from engagement with the discs 76 of the guide pins 27. The guide pins 27 are retained in an elevated position by action of the spring-biased pins 28. Upon further movement of the inserting pins 57 and 58, the discs 11 and 12 are advanced against the guide pins 27 causing the guide pins to move down against the restraining frictional force of the spring-biased pins 28. The discs 11 and 12 are consequently inserted within the apertures formed in the bridge 10 as shown in FIGS. 11 and 12. The inserting pins 57 and 58 are withdrawn, whereupon the cam 23 is again rendered effective to advance the turntable 14 to move the bridge 10 from the inserting apparatus 16 in anticipation of another cycle of operation of the overall mechanism.

It is to be understood that the above-described arrangements and construction of elemental parts are simply illustrative of an application of the principles of the invention and many other modifications may be made without departing from the invention.

What is claimed is:

1. Apparatus for inserting successive ones of a plurality of components into successive ones of a plurality of articles each having an aperture for receiving such a component, comprising a support for successive articles, a guide pin slidably mounted in said support and adapted to move through the aperture in the article supported thereby, an inserting pin slidably mounted for movement toward said guide pin and aligned therewith, means for advancing said guide pin through the aperture toward said inserting pin, means for frictionally retaining said guide pin in its advanced position, means for advancing a component between said inserting pin and said guide pin, and means for sliding said inserting pin to press the component forcibly against the guide pin and to move the component and the guide pin against the friction of said retaining means to insert the component into the aperture in the article.

2. Apparatus for inserting a plurality of components into each successive one of a plurality of articles each having a plurality of apertures for receiving said components, comprising a support for successive articles, a plurality of guide pins slidably mounted in said support and adapted to move through the apertures in the article supported thereby, a plurality of inserting pins, one for each of said guide pins, slidably mounted for movement toward said guide pins and aligned respectively therewith, means for advancing said guide pins through said apertures toward said inserting pins, means for frictionally retaining said guide pins in their advanced positions, means for advancing a component between each corresponding inserting pin and guide pin, and means for sliding said inserting pins to press the components forcibly against the guide pins and to move the components and the guide pins against the friction of said retaining means to insert the components into the apertures in the article.

3. Apparatus for inserting a component into an article having an aperture for receiving the component, the apparatus comprising a support for the article, a guide pin slidably mounted in said support and adapted to move through the aperture in the supported article, an inserting pin slidably mounted for movement toward said guide pin and aligned therewith, means for advancing said guide pin through the aperture towards said inserting pin, means for holding said guide pin in an advanced position with a predetermined force having a magnitude such that said guide pin can support the component on one end thereof, means for advancing a component between said inserting pin and said one end of said guide pin while said guide pin is in the advanced position, and means for driving said inserting pin against the component with a force sufficient to overcome the predetermined force provided by said means for holding said guide pin so that the component is held between said inserting pin and said guide pin during transportation thereof into the aperture.

4. Apparatus for inserting a plurality of components into each successive one of a plurality of articles each article having a plurality of apertures for receiving the components, comprising a support for successive articles, a plurality of guide pins slidably mounted in the support and adapted to move through the apertures in the supported article, a plurality of inserting pins, one for each of said guide pins slidably mounted for movement toward said guide pins and aligned respectively therewith, means for advancing said guide pins through said apertures toward said inserting pins, means for holding said guide pins in an advanced position with a predetermined force having a magnitude such that each of said guide pins can support a component on one end thereof, means for advancing the components between said inserting pins and the one end of each guide pin while the guide pins are in the advanced position, and means for driving said inserting pins against the components and guide pins with a force sufficient to overcome the predetermined force provided by said means for holding said guide pins so that the components are held between said inserting pins and said guide pins during transportation thereof into the apertures.

References Cited in the file of this patent

UNITED STATES PATENTS

| | | |
|---|---|---|
| 1,332,538 | Bourque | Mar. 2, 1920 |
| 1,735,609 | Frederick | Nov. 12, 1929 |
| 1,941,992 | Makenny | Jan. 2, 1934 |
| 1,944,360 | Meyer | Jan. 23, 1934 |
| 2,332,445 | Grim | Oct. 19, 1943 |
| 2,662,646 | McCain | Dec. 15, 1953 |
| 2,821,015 | Kuba | Jan. 28, 1958 |